INVENTOR
JOSEPH D. MISLAN
BY: Albert Sperry
ATTORNEY

United States Patent Office 3,337,741
Patented Aug. 22, 1967

3,337,741
SEMICONDUCTOR-CONTROLLED POWER CIRCUIT HAVING A SINGLE-POLE, DOUBLE-THROW SWITCHING ACTION
Joseph D. Mislan, Morrisville, Pa., assignor to Systems Matrix, Inc., Trenton, N.J., a corporation of New Jersey
Filed Oct. 14, 1964, Ser. No. 403,843
5 Claims. (Cl. 307—41)

ABSTRACT OF THE DISCLOSURE

A power circuit supplies electrical current from a common source to one or the other of at least two loads. For each load, there is a rectifier bridge network provided in its diagonal with a silicon-controlled rectifier which when driven permits current to flow to its associated load. Each rectifier is driven only to the exclusion of the other, to produce a continuous flow of current to one or the other of the loads, but never to both simultaneously. The circuit may be extended to supply power to any number of loads in a selected, following order.

In general, this invention relates to a power circuit through which 115 volt alternating current passes to a plurality of loads. In a more particular sense, the present invention has reference to a semiconductor-controlled circuitry in which a switching action produces a flow of current to one or the other of two loads. In accordance with the invention, one or the other of the loads is actuated at all times; both loads cannot be in "off" condition at the same time; and both loads cannot be supplied with power simultaneously.

The invention, thus, has the general characteristics of a single pole, double-throw switch, though having certain important advantages over conventional mechanical or electromechanical switches.

The invention may therefore be considered as having, as one important object thereof, the provision of a single-pole, double-throw switch action in situations in which conventional switches of this type may prove unreliable, excessively slow, or lacking in durability.

Summarized briefly, the invention includes circuitry embodying a pair of rectifier bridge networks, one for each of the two loads to which power is to be supplied on an alternative basis. The rectifier networks are provided, in their diagonals, with silicon-controlled rectifiers. Connected between the networks is a circuit including a transformer, and this connecting circuit provides isolation for the networks.

The loads and their associated networks are provided with connections to a source of 115 volt AC, and a low-energy DC signal voltage is provided, for driving the silicon-controlled rectifiers. The driving voltage is such that when one of the rectifiers is energized, the other is automatically prevented from being driven. Conversely, when the first silicon-controlled rectifier is not being driven, a driving voltage automatically appears in the other silicon-controlled rectifier. In this way, a current is supplied to either one or the other of the loads, according to which rectifier is being driven at the particular time.

An important object of the present invention, in addition to those set forth above, is to provide a switch of the character described that will be explosion-proof, by reason of the fact that there is no arcing during the switching action.

A further object of importance is to provide a switching circuit as stated that will be capable of embodiment in a compact structure, at a comparatively low cost considering the benefits obtained from the use thereof.

A further object of importance is to provide a switch which will be designed to carry a comparatively high rating at 115 volts AC, in relation to an extremely low DC actuating signal used to operate the device.

Still another object is to provide a switching circuit of the type stated in which the switching operation will be so rapid as to occur in a matter of microseconds, as compared to the comparatively slow operating speed of ordinary relays heretofore used in the same application.

Still another object is to provide a switch the durability of which will be such as to permit it to operate uninterruptedly through cycles numbering in the millions.

Yet another object is to provide a switching circuit which will lend itself to a wide variety of arrangements, including, for example, the control of a multiplicity of loads. It is proposed, in so doing, to facilitate the inter-related switching of loads that may be remote from one another. In accordance with the invention, this is achieved by a low voltage switching circuit utilizing light wire on the order of bell wire or the like, fully as far as the load itself. This is distinguished from arrangements which utilize relays or equivalent devices all of which require relatively heavy gauge wire that may need to be even heavier if extended long distances, in order to prevent voltage drop below a critical value.

Other objects will appear from the following description, the claims appended thereto, and from the annexed drawing, in which like reference characters designate like parts throughout the several views, and wherein:

Figure 1:
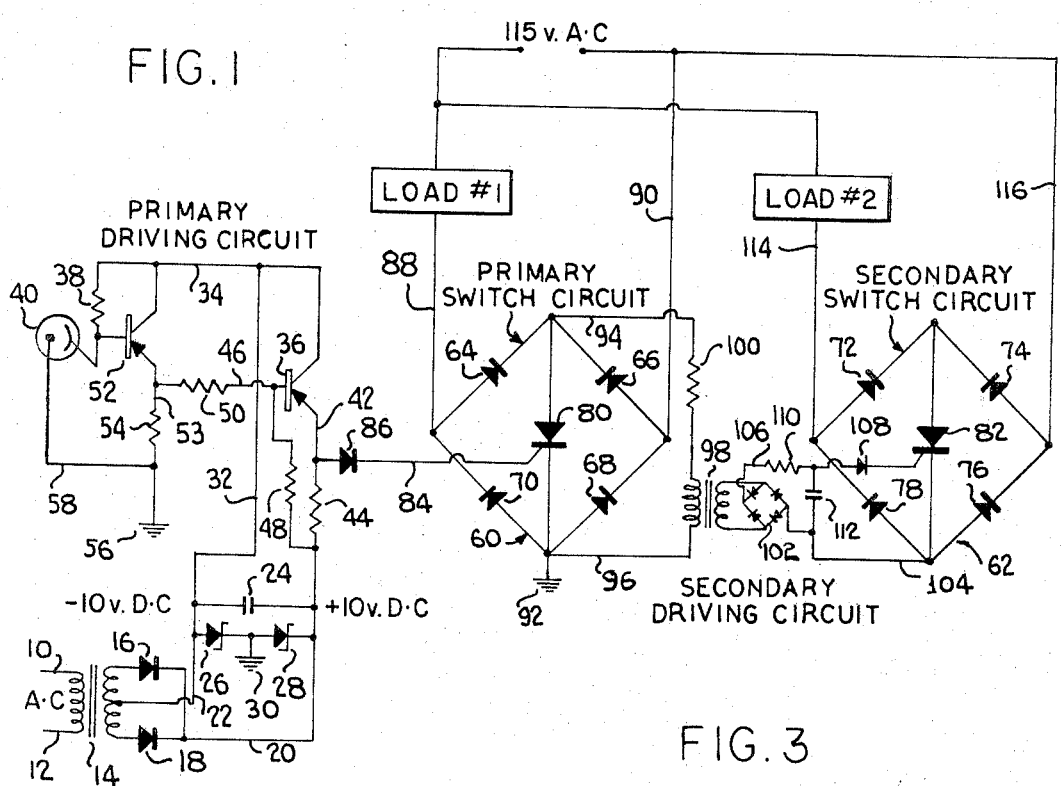
FIG. 1 is a schematic showing of the invention.

Referring to the drawing in detail, the invention is shown in the present instance, but not necessarily, in association with a photoelectric supply circuit. This is used for driving the silicon-controlled rectifiers incorporated in the power circuit that constitutes the present invention, and can be considered as a primary driving circuit. It is considered, in this regard, that means other than photoelectric cells could be employed to operate the switching means. It is mainly important that the switching means respond to a low energy DC signal, or possibly a small AC signal on the order of 10 millowatts. The photoelectric cells shown for the purpose of illustrating the operation of the invention is merely one type of circuit control means that is well known in the art. Many types of apparatus utilize such cells, to control switching between two pieces of equipment, responsive to the presence or absence of light energy in the photoelectric cell.

In the illustrated example, a power supply designed to provide a small DC signal to energize the photoelectric cell and drive the silicon-controlled rectifiers includes leads 10, 12 constituting the opposite sides of a conventional 115 volt AC circuit. Leads 10, 12 are connected to the primary winding of a transformer 14, to the secondary winding of which rectifiers 16, 18 are connected. The rectifiers are connected to the opposite terminals of the secondary winding, and have a common connection to a lead 20 constituting one side of the low energy DC circuit. The other side of the DC circuit is provided by a lead 22.

Connected to the secondary winding intermediate opposite ends thereof, and connected between the leads 20, 22 is a condenser 24. Also connected between the leads 20, 22 are rectifiers 26, 28, between which there is a connection to ground as at 30, the rectifiers 26, 28 constituting an impedance.

A lead 32 is connected between the lead 22 and a lead 34. Lead 34, at one end, is connected to the collector of a transistor 36. Lead 34, at its other end, is in series with a resistor 38, and is then connected to one of the electrodes of a photoelectric cell 40.

Connected to the emitter of the transistor 36 is a lead 42, and connected in series between the leads 20 and 42 is a resistor 44.

A lead 46 is connected to the base of the transistor 36, and in shunt between lead 46 and lead 42 is a resistor 48, which is thus connected in shunt across transistor 36 and resistor 44.

Connected in series with lead 46 is a resistor 50.

A transistor 52 has its base connected to lead 38, its collector connected to lead 34, and its emitter connected to lead 46. The emitter of transistor 52 is also connected to lead 53, which is in series with resistor 54. Lead 53 is connected to lead 58, extending from the other electrode of the photoelectric cell 40, and leads 53, 58 are then provided with a common connection to ground as at 56.

The circuitry so far described produces a small DC signal, for a purpose to be made presently apparent, which signal is utilized to drive a silicon-controlled rectifier incorporated in the invention, to energize a first load. This low energy is produced whenever the photoelectric cell is energized through the means heretofore described.

Accordingly, from the description so far provided, it can be properly concluded that the invention includes means in the form of a first or primary driving circuit for supplying a low energy signal in response to a predetermined operating condition, as for example the energization of a photoelectric cell.

It is appropriate now to consider the rectifier bridge networks and their associated connections, incorporated in the invention. In the illustrated example, there are two such networks generally designated 60, 62, respectively. To facilitate the understanding of the invention, it can be considered that network 60 is a first or primary switching circuit or network controlling the flow of 115 volts AC to a first load designated load No. 1 in the schematic FIG. 1 showing of the invention. Network 62 can appropriately be termed a secondary switching circuit or network controlling the flow of current to a second load, designated load No. 2. The loads can be any of various types of equipment, apparatus, motors, or the like and it is sufficient for the purposes of this description to note only that the switching means constituting the invention will energize loads of ratings up to perhaps approximately 15 amperes at 115 volts AC. This as previously noted herein, is all in response to an extremely low signal, such as the DC signal produced in response to energization of the photoelectric cell 40.

In any event, the network 60 includes rectifiers 64, 66, 68, and 70. Network 62 includes a corresponding arrangement of rectifiers 72, 74, 76, 78.

Connected in the diagonal of network 60 is a silicon-controlled rectifier 80, and similarly connected in the network 62 is a silicon-controlled rectifier 82.

Rectifier 80 is connected, at its gate to a lead 84, which is connected to the output of a rectifier 86, the gate of which is connected to the lead 42.

Connected to opposite sides of the network 60, and disposed at opposite sides of the diagonal of said network, are power supply leads 88, 90, extending to the opposite sides of a source of 115 volt AC electric power. In the lead 88 the load No. 1 is connected, in the illustrated example of the invention.

A ground connection is provided for the network 60, as shown at 92, at one end of the diagonal of the network.

To the opposite ends of the diagonal of the network 60 there are connected leads 94, 96, which are joined to the opposite terminals of the primary winding of a transformer 98. In series with lead 94 is a resistor 100.

A rectifier bridge circuit or network 102 is connected at its opposite sides to the opposite terminals of the secondary winding of the transformer 98. Network 102 can appropriately be termed a secondary driving circuit. Extending from the network 102 is a lead 104, which is connected to one end of the diagonal of the network 62. Also extending from the network 102 is a connection 106 to the gate of a rectifier 108. In series with said rectifier 108, in the connection 106, is a resistor 110.

The output of the rectifier 108 is connected to the gate of the silicon-controlled rectifier 82.

Connected in shunt across the leads 106, 104 is a condenser 112.

As previously noted, the network 62 is used to control the flow of current to load No. 2. To this end, there is provided a lead 114, which constitutes one side, that is, one power supply lead from the 115 volt AC current supply. Lead 114 is in series with the load No. 2, and providing the other side of the power supply circuit for load No. 2 is a conductor or lead 116.

It is appropriate now to consider the operational characteristics of the device. As previously noted, the device is designed to supply 115 volt A.C. current to either the load No. 1, or alternatively, to the load No. 2. One or the other of these loads is energized at all times that the device is in operation, but both loads are never energized simultaneously. Therefore, the circuitry embodied in the invention has the characteristic of a single pole, double-throw switch.

Also as previously noted herein, the device constituting the invention operates in response to the presence or absence of a low energy signal, preferably a D.C. signal of the type shown at the left in the schematic illustration of the invention. In the present instance, this signal is present or absent, according to whether there is light or dark resistance, respectively, in the photoelectric cell. In this way, positive driving voltage for silicon-controlled rectifier 80 is provided, when the photoelectric cell is energized. Alternatively, it would be possible to substitute a time delay circuit for the photoelectric cell and its illustrated amplification means. In this instance, positive driving voltage for the silicon-controlled rectifier means would be provided through the timer circuit.

In use, and asuming that the photoelectric cell 40 is energized, a positive driving voltage, produced by a small D.C. signal as shown, will be directed to lead 84 to the gate of the rectifier 80 and assuming that current is being supplied at the 115 volt power source, load No. 1 will be energized.

This supply of power to load No. 1 occurs due to the fact that current will flow through lead 88, rectifier 64, rectifier 80, rectifier 68, and back to the source of 115 volt power through lead 90, thus energizing load No. 1. Such current will flow, however, only when positive driving voltage is being supplied through lead 84 to the rectifier 80. Therefore, it can be assumed for the purpose of the present description that load No. 1 will be energized whenever the photoelectric cell 40 is energized.

Assuming that load No. 1 is to be de-energized whenever the cell 40 is de-energized, and that load No. 2 is to be energized under these conditions, it may be noted that under no circumstances can load No. 2 be supplied with power at a time when positive driving voltage is present in the rectifier 80. This is true because the primary of the coupling transformer 98 is shorted out, in effect, whenever rectifier 80 is conducting, that is, whenever this rectifier is being supplied with driving voltage. This shorting effect occurs due to the fact that there is a large impedance in the primary of the transformer 98, as compared to load No. 1.

At any time that the primary of the transformer 98 is shorted out, no voltage will appear in the secondary winding of the transformer, and hence, driving voltage will not be supplied to the rectifier 82.

Assuming, now, that the photoelectric cell has been de-energized, driving voltage in rectifier 80 will no longer appear. As a result, current will now be supplied to the primary of the transformer 98, and this will have the result of supplying driving voltage to the rectifier 82. The current supplied to the primary winding of the transformer flows through lead 90, rectifier 66, lead 94, primary winding of transformer 98, lead 96, and ground 92. The rectifier network 102, connected as shown in association with resistor 110, condenser 112, and transformer 98, has the effect of providing full wave, rectified direct current for driving the silicon-controlled rectifier 82.

Whenever the driving voltage is being supplied to the rectifier 82, load No. 2 will be suplied with 115 volt A.C. power.

The flow of current, to energize the load No. 2 is from one side of the 115 volt power supply, through lead 114, rectifier 72, rectifier 82, rectifier 76, and back to the current supply through lead 116, thus causing power to be supplied to load No. 2 which is in series in the lead 114.

Important advantages have been found in a switching device of the character described. Heretofore, in situations of this type the common practice has been to utilize a conventional relay or like, and this has produced certain disadvantages. One important disadvantage results from the fact that a relay does not have a sufficient rapidity of operation, required in certain applications. In other instances, it may be necessary that either load No. 1 or load No. 2 be energized constantly, 24 hours a day for weeks at a time with the switching action occurring regularly throughout this period. In such instances, a relay does not have sufficient longevity or durability, and hence tends to fail under circumstances which can prove disastrous in certain applications.

Still further, in many instances it is not possible to utilize a switch or equivalent device which will arc when the switching action takes place. For example, the installation may be in an atmosphere heavily laden with explosive gases. In thes circumstances, its is obvious that arcing has great dangers. A switch of the type illustrated and described herein has the effect of eliminating such dangers.

In this connection, another advantage found in the switch is that it can be rated relatively high, in relation to a very small D.C. or A.C. signal used to drive the same. This permits the use of low-power, highly sensitive actuating devices such as the illustrated photoelectric cell, in circumstances which allow such sensing devices to control thes upply of power to heavy pieces of equipment.

Yet another advantage of the switch device illustrated and described can be found in the fact that despite its durability, speed of operation, and other characteristics hereinbefore described, the switch can nevertheless be manufactured in a compact form, at comparatively low cost.

A further advantage resides in the unusual adaptability of the device to serve as a switching control for a multiplicity of loads which might, for example, be located remotely from one another. I have shown this in block diagrams, in FIGS. 2 and 3. These are merely illustrative of many arrangements that can be used.

Figure 2:
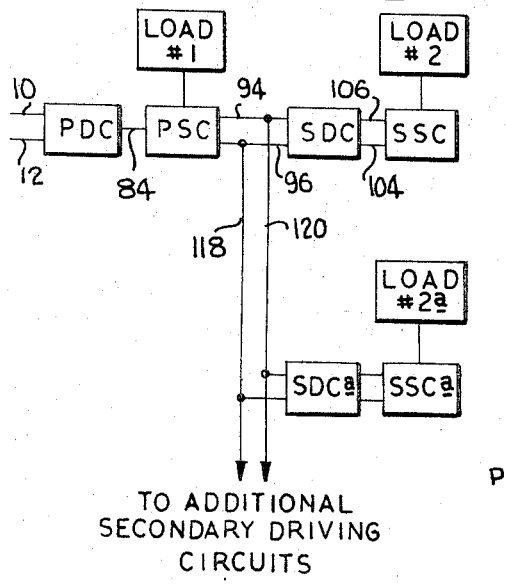
FIG. 2 is a block diagram showing one example of the manner in which the invention may control a multiplicity of loads.

In FIGURE 2, I have shown an arrangement in which there is a single primary load (load 1) and a multiplicity of secondary loads (loads 2 and 2a). The number of secondary loads can be increased as desired, merely by providing an additional secondary driving circuit and secondary switching circuit for each additional secondary load. As regards loads 1 and 2, the arrangement is identical to that of FIG. 1, including a primary driving circuit (PDC); primary switching circuit (PSC); load 1; secondary driving circuit (SDC); secondary switching circuit (SSC); and load 2.

To add secondary loads, one merely runs connections 118, 120 from leads 94, 96 respectively. Connections 118, 120 would extend to the terminals of the primary of the transformer of secondary driving circuit SDCa, associated with a secondary switching circuit SSCa and load 2a. Additional secondary driving circuits, each with its associated secondary switching circuit and secondary load, can be connected into the circuitry by extending the parallel wiring connections as indicated in the block diagram of FIG. 2.

In such an arrangement, it is possible to energize load 1, with all secondary loads off. To turn load 1 off, the primary driving circuit can be caused to open in any desired manner, as by means of a timer, photocell operation, etc. In any event, when load 1 goes off, loads 2 and 2a would be energized.

Secondary driving and switching circuits individual to the respective secondary loads are desirable, for various reasons. For example, the secondary loads may be remote from one another. The isolation of their circuits permits light gauge wire to be run to each load, rather than the heavy wire that would be needed if all the secondary loads were merely connected in parallel with all of them controlled by a single secondary switching circuit.

At this point, it should be noted that I physically locate each load and its own primary or secondary switching circuit in juxtaposition or at least in close proximity to each other. The secondary driving circuits, however, can be physically located anywhere between the primary and secondary switching circuits. The primary driving circuits can also be located anywhere desired. This means that as regards loads 1 and 2 separated physically by a great distance, I need run heavy wire, required for power leads 88, 90, 114 and 116, only from each load to the nearest source of 115 v. AC power. All other connections between components of the device, such as leads 84, 94, 96, 104, 106, 118 and 120, can be a very light wire and hence can be efficiently run over long distances and through elongated, confined spaces such as in the walls of a tall building.

With further reference to FIG. 2, another reason for providing each secondary load with its own individual secondary driving circuit and switching circuit is that I may desire to intermix the operation of various primary and secondary loads. Thus, I may use a multiplicity of primary driving circuits as well as a multiplicity of secondary driving circuits. In this way, by closing the primary driving circuits in an established sequence (as through the use of timers), I may energize load 1, then load 2d, then load 1a, and then loads 2, 2a, 2b, and 2c. This can be done by connecting the secondary driving circuit individual to load 2a to the primary switching circuit of load 1, while connecting all the secondary driving circuits for loads 2, 2a, 2b and 2c in parallel to the primary switching circuit of load 1a.

Figure 3:
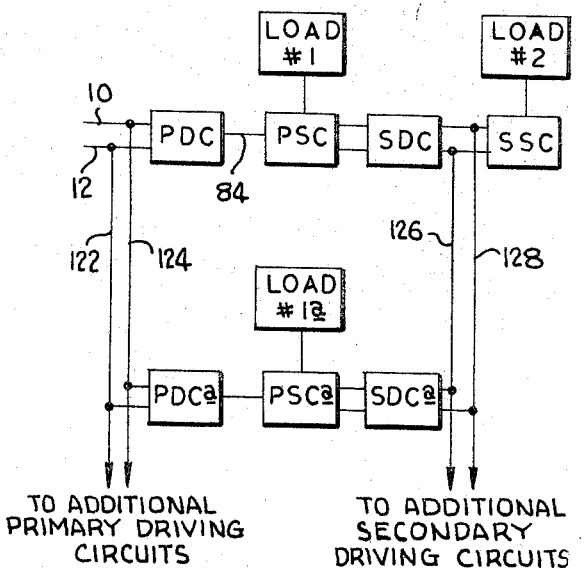
FIG. 3 is a block diagram showing a second example of a multiple-load switching arrangement.

In FIG. 3, the invention is applied to a situation in which there is a single secondary load 2 and a plurality of primary loads 1, 1a. In this instance, I connect the basic primary driving circuit, and a primary driving circuit PDCa to a source of power. I may do this by extending leads 122, 124 from leads 10, 12 respectively to the driving circuit 2a as shown. Alternatively, I can connect the circuit 2a directly to a power source.

In any event, the several primary driving circuits (two are shown merely by way of example) are each connected to its own individual primary switching circuit, as shown by circuits PSC and PSCa. Loads 1 and 1a are controlled by the respective primary switching circuits. Then secondary driving circuits are connected individually to the respective primary switching circuits as shown at SDC and SDCa. A single secondary switching circuit SSC, and its secondary load 2, are driven by any one of the multiplicity of secondary driving circuits.

In this arrangement, the several primary driving circuits can be closed in any desired sequence, as for example, by timers included therein. In such an arrangement, load 1 could be first energized. Then, as PDC opens, load 2 is energized. Then, PDCa can close, which automatically causes load 1a to be energized simultaneously with deenergizing of load 2. Then as load 1a is turned off by timed opening of PDCa, load 2 is turned on again, etc.

It is important to note that the basic circuitry shown in FIG. 1 is retained, in every instance. Yet, an almost limitless number of load combinations, and sequenced switching therebetween, is possible. This is important in many applications, as for example, in traffic light control and the like. This particularly advantageous, for example, in situations in which there is little repetition of load combinations, and each must be tailored to meet a particular, given load-switching problem.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

I claim:

1. An arc-less alternating current full wave power switching circuit for alternating an energizing current between at least one first and one second load comprising, in combination with a power supply for the loads and with a source of driving voltage:
    (a) a first rectifier bridge network connected between the first load and the power supply and including a first rectifier carrying current between the first load and said power supply, said first rectifier conducting solely in the presence of driving voltage emanating from said source;
    (b) a second rectifier bridge network connected between the second load and said power supply and including a second rectifier carrying current between the second load and said power supply, said second rectifier conducting solely in the presence of said driving voltage thereat; and
    (c) means connecting the source of driving voltage to the second rectifier, said first rectifier being connected across said means and short-circuiting the same to prevent the flow of driving voltage to the second rectifier whenever the first rectifier is in a conducting condition.

2. An arc-less alternating current full wave power switching circuit for alternating the flow of current between at least one first and one second load comprising, in combination with a power supply for the loads and with a source of driving voltage:
    (a) a first rectifier bridge network connected between the first load and the power supply, said first network including a diagonal and a first rectifier connected in the diagonal as a conductor of current between the first load and said power supply, said first rectifier conducting solely in the presence of driving voltage emanating from said source;
    (b) a second rectifier bridge network connected between the second load and the power supply, said second network including a diagonal and a second rectifier connected in the second-named diagonal as a conductor of current between the second load and said power supply, said second rectifier conducting solely in the presence of said driving voltage therein; and
    (c) means connected between the ends of the first network diagonal and the second rectifier and supplying driving voltage to the second rectifier, said first rectifier being connected across said means and short-circuiting the same when the first rectifier is in conducting condition so as to prevent the flow of driving voltage to the second rectifier.

3. A switching circuit as in claim 2, wherein said means includes a transformer having a primary winding connected to the first network and the secondary winding connected to the second network, the impedance of the primary winding being of greater value than the maximum current conducted through the first rectifier, whereby to produce the short-circuiting of said means when the first rectifier is in a conducting condition.

4. An arc-less alternating current full wave power switching circuit for alternating the flow of current between at least one first and one second load comprising, in combination with a power supply for the loads and with a source of low energy driving voltage:
    (a) a first rectifier bridge network connected between the first load and the power supply, said first network including a diagonal and a first silicon-controlled rectifier connected in the diagonal as a conductor of current between the first load atnd said power supply, said first rectifier conducting solely in the presence of driving voltage emanating from said source;
    (b) a second rectifier bridge network connected between the second load and said power supply, said second network including a diagonal and a second silicon-controlled rectifier connected in the second diagonal as a conductor of current between the second load and said power supply, said second rectifier conducting solely in the presence of said driving voltage therein; and
    (c) a connecting circuit between the first and second networks, said connecting circuit being connected through the medium of the first network to the source of driving voltage, and including a coupling transformer the primary winding of which is connected to opposite ends of the diagonal of the first network, the secondary winding of said transformer being connected to the second network and being arranged to supply driving voltage to the second silicon-controlled rectifier whenever driving voltage is induced through the transformer, the first silicon-controlled rectifier when in a conducting position being disposed in short-circuiting relation to the primary winding to prevent the flow of current to the transformer, whereby to provide driving voltage for the second silicon-controlled rectifier solely in the absence of driving voltage at the first rectifier.

5. A switching circuit as in claim 4 wherein the connecting circuit between the networks includes a third rectifier network interposed between the secondary winding and the second network and arranged to produce rectified direct current of a value effective to drive the second silicon-controlled rectifier.

References Cited

UNITED STATES PATENTS

| | | | |
|---|---|---|---|
| 3,131,343 | 4/1964 | Reinert | 321—16 |
| 3,189,748 | 6/1965 | McMurray | 307—41 |
| 3,202,903 | 8/1965 | Reibs | 323—45.3 |
| 3,275,921 | 9/1966 | Fellendorf et al. | 323—45.3 |
| 3,282,155 | 11/1966 | Cleary | 307—88.5 X |

ORIS L. RADER, *Primary Examiner.*

T. J. MADDEN, *Assistant Examiner.*